United States Patent
Schipper et al.

(10) Patent No.: US 10,209,130 B2
(45) Date of Patent: Feb. 19, 2019

(54) SPECTROMETER WITH OPERATOR ASSISTANCE FOR MEASUREMENT OPTIMIZATION

(71) Applicant: Kaiser Optical Systems Inc., Ann Arbor, MI (US)

(72) Inventors: Darren Schipper, Ann Arbor, MI (US); Joseph B. Slater, Dexter, MI (US); James M. Tedesco, Livonia, MI (US)

(73) Assignee: Kaiser Optical Systems Inc., Ann Arbor, MI (US)

( * ) Notice: Subject to any disclaimer, the term of this patent is extended or adjusted under 35 U.S.C. 154(b) by 0 days.

(21) Appl. No.: 15/986,918

(22) Filed: May 23, 2018

(65) Prior Publication Data

US 2018/0340822 A1    Nov. 29, 2018

Related U.S. Application Data

(60) Provisional application No. 62/509,940, filed on May 23, 2017.

(51) Int. Cl.
| | |
|---|---|
| *G01J 3/00* | (2006.01) |
| *G01J 3/02* | (2006.01) |
| *G01J 3/42* | (2006.01) |
| *G01J 3/28* | (2006.01) |

(52) U.S. Cl.
CPC ............... *G01J 3/027* (2013.01); *G01J 3/42* (2013.01); *G01J 2003/283* (2013.01)

(58) Field of Classification Search
CPC ........ G01J 3/02; G01J 3/44; G01J 3/28; G01J 3/26; G01J 3/42; G06K 9/46; G06T 7/00; H04N 1/60; G01R 35/00; G06F 19/00
See application file for complete search history.

(56) References Cited

U.S. PATENT DOCUMENTS

2007/0192049 A1* 8/2007 Archie ................... G01D 18/00
                                                                        702/85

* cited by examiner

*Primary Examiner* — Abdullahi Nur
(74) *Attorney, Agent, or Firm* — Christopher R. Powers; PatServe

(57) ABSTRACT

The present disclosure relates to assistive mechanisms and methods that aid an operator of a spectrometer to make spectral measurements of a sample, the measurements having a desired quality. The method enables quality spectral measurements quickly and simply, without a prior understanding of a sample's spectrum or of the details as to how the spectrum is measured. Data quality is improved, and the time required to collect the data is reduced. While a specific example of sample optic focus is disclosed in detail, the optimization of numerous other parameters is possible.

20 Claims, 2 Drawing Sheets

SPECTROMETER WITH OPERATOR ASSISTANCE FOR MEASUREMENT OPTIMIZATION

CROSS-REFERENCE TO RELATED APPLICATION

The present application is related to and claims the priority benefit of U.S. Provisional Patent Application No. 62/509,940, filed on May 23, 2017, the entire contents of which are incorporated herein by reference.

TECHNICAL FIELD

The present disclosure generally relates to spectroscopic systems, in particular methods to improve measurements using spectroscopic systems.

BACKGROUND

An operator of a spectrometer must sometimes manually establish the position of a sampling optic of a probe head relative to a sample to be analyzed. The known approaches to determining a suitable positioning of the sampling optic (i.e., probe) relative to the sample consist of a subjective assessment by the operator of the spectral characteristics of multiple test measurements, which may require substantial domain expertise to develop proficiency. Particularly in the presence of weak signals, the test measurements may be lengthy to obtain sufficient data to generate a spectrum. Following a test measurement, the probe/sample positioning is adjusted by the operator. In some cases, the test measurements are collected automatically and repeatedly while the operator arranges the probe and sample.

Suboptimal arrangement of the probe relative to the sample can greatly degrade the quality of the spectral measurement. Achieving an optimal arrangement can be challenging for the operator, especially in the presence of weak signals which require lengthy measurements to yield informative spectra.

Accordingly, there remains a need for further contributions in this area of technology.

SUMMARY

The present disclosure provides assistive mechanisms and methods that aid an operator of a spectrometer to make spectral measurements of a sample, the measurements having a desired quality. The method enables quality spectral measurements quickly and simply, without a prior understanding of a sample's spectrum or of the details as to how the spectrum is measured. Data quality is improved, and the time required to collect the data is reduced. While a specific example of sample optic focus is disclosed in detail, the optimization of numerous other parameters is possible.

A method of assisting an operator of a spectrometer to improve the quality of a spectral measurement of a sample includes the step of providing a spectrometer with a probe with a sample optic and a detector having a dynamic range, and wherein the spectrometer is controlled by a processor in communication with a display device.

A regular update interval is defined and a series of automatic spectral measurements of a sample are performed during the update interval. At the end of each update interval, a quantitative measurement quality metric (hereinafter "MQM") is calculated and displayed based upon the combined spectral measurements of the sample taken during update interval. Information is provided to the operator enabling the operator to adjust the MQM, with the measurement and feedback steps being repeated as desired to achieve the desired quality of spectral measurement. The feedback provided to the operator may be visual, audible and/or tactile.

In certain embodiments, the MQM is a function of time, and the update interval may be on the order one second. The information provided to the operator may include information advising the operator to position the probe or the sample to improve the MQM. In alternative embodiments, the MQM may represent different characteristics and may be used to enhance detector gain or temperature, spectrograph etendue, dispersion, or slit width; numerical aperture of the sampling optic, laser wavelength, or band position relative to detector matrix.

According to at least one aspect of the present disclosure, a method of assisting an operator of a spectrometer to enhance the quality of a spectral measurement of a sample includes: providing a spectrometer including a probe and a detector having a dynamic range, wherein the spectrometer is controlled by a processor in communication with a display device; defining a regular update interval; performing a series of automatic, individual spectral measurements of a sample during the update interval; at the end of the update interval, calculating and displaying via the display device a measurement quality metric (MQM) based upon a combined spectral measurement of the sample taken during update interval using the processor; providing information to the operator enabling the operator to optimize the MQM; and repeating the series of individual spectral measurements, calculating and displaying the MQM, and providing information to the operator until a desired quality of the combined spectral measurement of the sample is achieved.

In at least one embodiment, the information provided to the operator includes information advising the operator to position the probe and/or the sample to optimize the MQM. Optimizing the MQM includes minimizing, maximizing or approaching a desired value.

In certain embodiments of the disclosed method, the method further includes dynamically adjusting the length and number of individual measurements in the update interval to stay within the dynamic range of the detector. In certain embodiments, the method further includes aggregating the individual measurements taken during an update interval into the combined spectral measurement for that update interval.

In at least one embodiment, the update interval is approximately one second. In certain embodiments, the MQM is a function of time, a spectral intensity per unit time, a detector saturation per unit time, a signal-to-noise ratio at a fixed acquisition length, a residual sum of squares of the measured spectrum versus a known reference, and/or a repeatability of a sample property of interest as calculated using an analytical model. In an embodiment, the sample property of interest is melt index.

In at least one embodiment, the MQM and the information provided to the operator are used to optimize one or more of the following: detector gain, detector temperature, spectrograph etendue, spectrograph dispersion, spectrograph slit width, numerical aperture of the probe, laser wavelength, and band position relative to a detector matrix of the detector. In certain embodiments, the information provided to the operator is visual, auditory or haptic. In such embodiments, the visual information provided to the operator is graphical or numerical, the auditory information provided to the operator is a modulated tone pattern or an audio frequency, and the haptic information provided to the operator is a modulated vibrational pattern or a vibrational frequency.

According to a further aspect of the present disclosure, a spectroscopic system for enhancing the quality of a spectral measurement of a sample, the spectroscopic system includes: a spectrometer having a detector in optical communication with a probe having a sample optic, wherein the spectrometer is adapted to measure signals from a sample; a display device; and a processor configured to control the spectrometer and the display device and to calculate a measurement quality metric (MQM), the processor further configured to develop a spectrum from the measured signals, to display the spectrum on the display device, to provide information to an operator of the spectrometer, enabling the operator to optimize the MQM until a desired quality of the combined spectral measurement of the sample is achieved. In at least one embodiment, the MQM is one of the following: a function of time; a spectral intensity per unit time; a detector saturation per unit time; a signal-to-noise ratio at a fixed acquisition length; a residual sum of squares of the measured spectrum versus a known reference; and a sample property of interest as calculated using an analytical model.

BRIEF DESCRIPTION OF THE DRAWINGS

The described embodiments and other features, advantages and disclosures contained herein, and the manner of attaining them, will become apparent and the present disclosure will be better understood by reference to the following description of various embodiments of the present disclosure taken in junction with the accompanying drawings, wherein.

DETAILED DESCRIPTION

Figure 1:
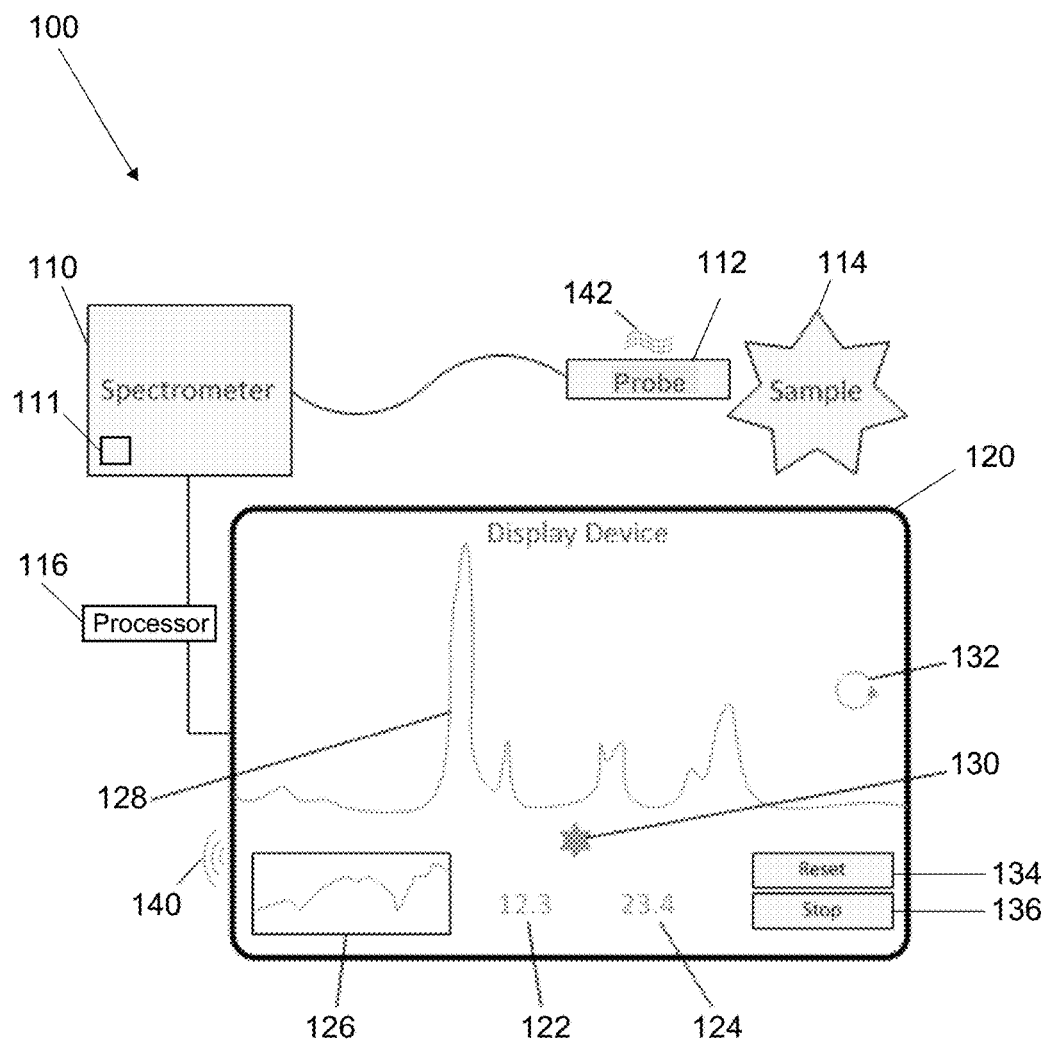
FIG. 1 shows a schematic of an embodiment of a spectroscopic system according to the present disclosure, including a display device depicting a spectrum, measurement data and a MQM.
Figure 2:
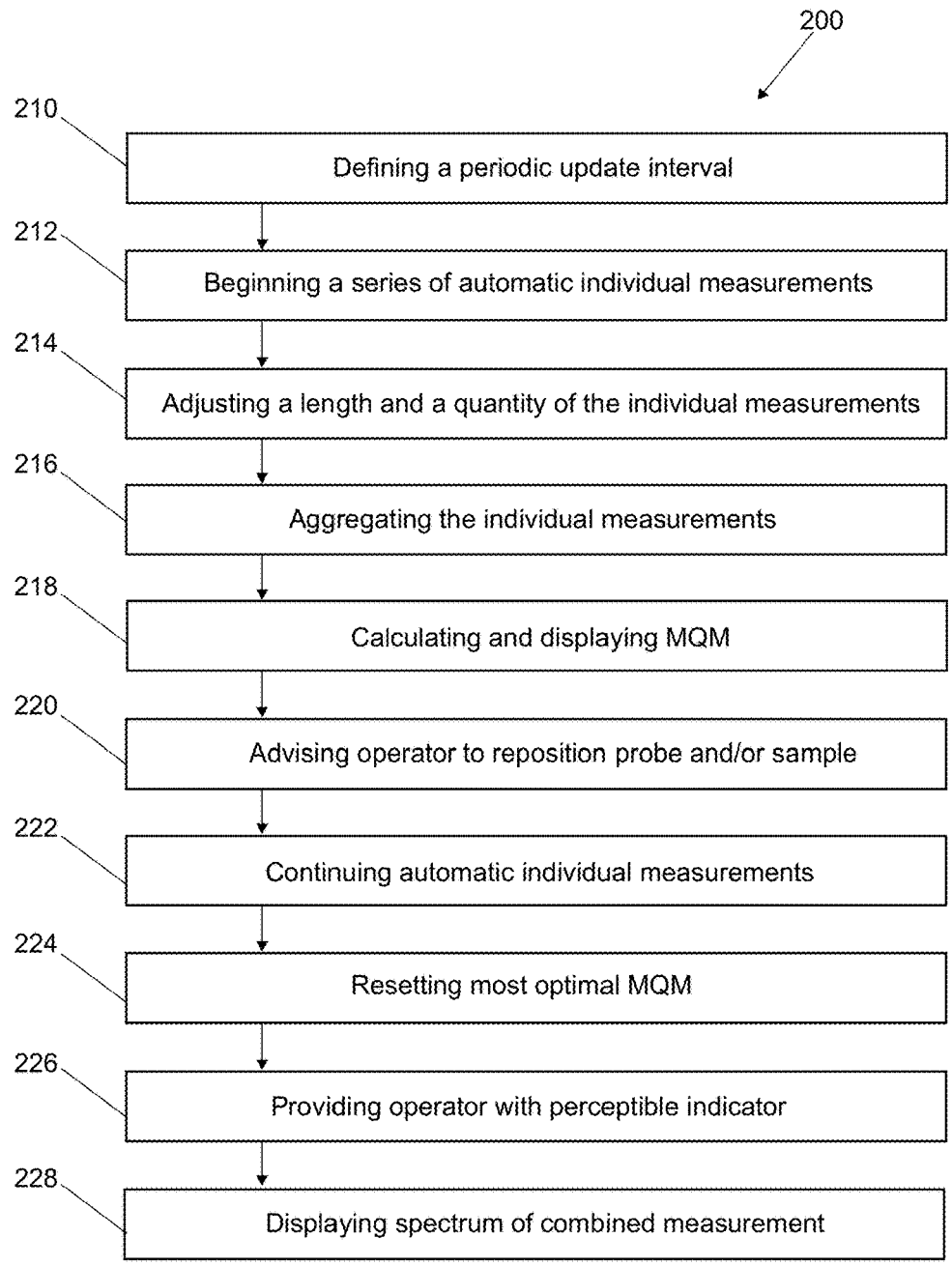
FIG. 2 illustrates a focusing method, according to an embodiment of the present disclosure.

In embodiments according to the present disclosure, a quantitative measurement quality metric (MQM) is derived and displayed at the end of a measurement update interval, enabling an operator of a spectroscopic system to improve the MQM and achieve a desired measurement quality of a sample. In at least one embodiment, the MQM is implemented such that its scale is not influenced by the length of the update interval, or by the dynamically adjusted number or length of the individual measurements in the update interval. As such, the MQM may be indexed to time.

According to the present disclosure, the MQM may be employed to quantify the similarity of a measured spectrum to an idealized reference spectrum. In an embodiment, in quantifying measurement quality, the value of the MQM may double when the time required to collect the same amount of signal from the sample in a spectrum having identical shape is reduced by one half. The spectroscopic system can automatically assess signal strength to dynamically adjust the number of measurements included in a moving average of the spectrum. Dynamically adjusting the number of measurements maximizes feedback responsiveness while displaying sufficient spectral detail to serve as a useful guide to the operator, which is augmented by the MQM.

As described herein, different types of feedback may be provided based upon different types of operational parameters. In accordance with one embodiment, focus of the spectrometer's probe having a sample optic is optimized through an iterative process in which the relative position of spectrometer's probe and the sample are adjusted to increase the MQM. At the end of each update interval, the combined measurements are used to calculate and display the MQM, for example, as spectral intensity per second. In such an embodiment, the operator is advised to position the probe and/or sample to optimize the MQM.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

In one aspect of the present disclosure, a spectroscopic system 100 is disclosed. As shown in FIG. 1, the spectroscopic system 100 may include a spectrometer 110 having a detector 111 in optical communication with a probe 112 (having a sample optic or, alternatively, referred to as a sample optic) and in data communication with a display device 120. In operation, the spectroscopic system 100 may be used to measure signals from a sample 114, to develop a spectrum 128 from the measured signals, and to display the spectrum 128 on the display device 120.

The spectroscopic system 100 may further include a processor 116 configured to control the spectrometer 110, calculate the MQM, control the display device 120 and perform other operations. In certain embodiments, the processor 116 forms at least a portion of a processing subsystem, including one or more computing devices having a memory, processing and communication hardware. The processor 116 may be a single device or a distributed device, and the functions of the processor 116 may be performed by hardware and/or by a computer executing instructions stored in non-transient memory on one or more computer readable media (e.g., firmware or software). In certain embodiments, the processor 116 includes one or more modules structured to functionally execute operations of the controller.

The display device 120 may be configured to display, in addition to the spectrum 128, other graphical features. For example, in certain embodiments, the display device 120 may be configured to display an update indicator 130, a turnover indicator 132, a current MQM indicator 122, a best MQM indicator 124 and/or a MQM trendline indicator 126. In further embodiments, the display device 120 may be configured to display a graphical reset button 134 and/or a graphical stop button 136.

The graphical reset button 134 may be configured to cause the processor 116, upon actuation by the operator, to reset the displayed spectrum 128, the update indicator 130, the turnover indicator 132, the current MQM indicator 122, the best MQM 124 indicator and/or the MQM trendline indicator 126. Resetting the foregoing graphical features may include removing some or all of the foregoing graphical features from the display or, in certain embodiments, displaying predetermined baseline values for some or all of the foregoing graphical features. The graphical stop button 136 may be configured to cause the processor 116, upon actuation by the operator, to stop taking measurements of the sample 114, calculating the MQM, updating the display device 120 and/or performing the other operations for which the processor 116 is configured. Upon actuation by the operator, the processor 116 may modify the stop button 136 to display "START" or other suitable indicator in the same region of the display device 120. Upon actuation by the operator of the modified the stop button 136, the spectrometer may restart taking measurements of the sample 114.

In certain embodiments, the spectroscopic system 100 may include one or more means of providing an operator with feedback regarding individual measurements taken using the spectrometer 110, a frequency of an update interval for taking the individual measurements and/or a deviation of the MQM from a desired measurement quality. The means of providing an operator with feedback may provide the operator with visual, audible and/or tactile feedback. For example, in certain embodiments, the processor 116 may provide the operator with audible feedback 140 via a speaker integrated into the display device 120, as shown in FIG. 1, or via a separate audio device. Alternatively or additionally, the processor 116 may provide the operator with haptic feedback 142 via the probe 112 held by the operator, for example, by generating a modulated vibrational pattern or frequency. Alternatively or additionally, the processor 116 may provide the operator with visual feedback, for example, using the update indicator 130, turnover indicator 132, current MQM indicator 122, best MQM indicator 124 and/or MQM trendline indicator 126 graphical features via the display device 120. Alternative or additional visual feedback may include energizing a light source (e.g., a light-emitting diode) integrated into the probe 112.

In another aspect of the present disclosure, a comprehensive focusing method 200 is disclosed that uses the spectroscopic system 100 to maximize the MQM of measurements of the spectrometer 110 based upon the relative position of the probe 112 relative to the sample 114. The focusing method 200 includes a step 210 of defining a periodic update interval (e.g., one second). The focusing method 200 includes a step 212 of beginning a series of automatic individual measurements of the sample 114 using the spectrometer 110 and probe 112. The focusing method 200 may further include a step 214 of dynamically adjusting a length of the individual measurements and a quantity of the individual measurements taken in the update interval to stay within a dynamic range of the detector 111 of the spectrometer 110. The focusing method 200 may further include a step 216 of aggregating the individual measurements into a single, combined measurement for the update interval.

In a step 218 of the focusing method 200, at the end of each update interval, the combined measurement is used to calculate a quantitative MQM as an intensity per second and to display the MQM on the display device 120 (e.g., using the MQM indicator 122). In a step 220, an operator of the spectrometer 110 is advised to reposition the probe and/or sample so as to optimize the MQM to a desired measurement quality. The focusing method 200 may further include a step 222 of continuing the automatic individual measurements until the operator terminates the focusing method 200 or until an automated mechanism (e.g., the processor 116) detects that the desired measurement quality has been achieved.

Achieving the desired measurement quality may be facilitated in various ways. In at least one embodiment, in the step 218, the MQM is calculated automatically, which reduces a level of adequate operator expertise and reduces the influence of operator variability on the measurement quality. As guided (i.e., advised) by the focusing method 200, a non-expert operator can successfully follow the provided advice to optimize the MQM without understanding the details of the sample's spectrum, how the spectrum is measured, or how the MQM is calculated. The ability of the operator to consistently achieve a sufficient and desired measurement quality in repeated attempts, or for two operators to achieve a similar result, is thereby enhanced.

The update interval may be relatively short such that the operator is provided with feedback at a frequency that supports human perceptions of system responsiveness. In one embodiment, the update interval is consistently periodic, thereby enhancing the operator's ability to predict system behavior and easing the coordination of manual operator actions with the automated action of the system.

In the step 218 of an embodiment of the focusing method 200, the most optimal (e.g., maximum or minimum) MQM observed since the beginning of the focus procedure may be displayed on a display device 120 (e.g., using the best MQM indicator 124), thereby orienting the operator as to achievable measurement quality and discouraging acceptance of probe/sample positioning corresponding to an MQM significantly below than that which is achievable.

In a step 224 of an embodiment of the focusing method 200, the most optimal MQM may be reset by the operator or automatically (e.g., when the operator initiates the focusing method 200) such that observations before such a reset may be discarded. Resetting the most optimal MQM enables the operator to disregard spurious, seemingly "good" MQM values that may arise from non-sample sources (i.e., noise) or that correspond to spectral features other than those of interest to the operator.

In a step 226 of an embodiment of the focusing method 200, a perceptible indicator (e.g., visible, audible, or haptic) is provided at the end of each update interval, which conveys the cadence of updates to the operator, thereby informing the operator of choices of when to adjust the probe/sample positioning. In the step 226, the processor 116 may activate the audible feedback 140 and/or the haptic feedback 142 to provide the perceptible indicator. The processor 116 may further provide a visual indictor via the update indicator 130 and/or MQM trendline indicator 126 graphical features via the display device 120.

In an embodiment, the step 218 may include displaying a dynamically updated trendline of the MQM on the display device 120 using the MQM trendline indicator 126, which aids in visualizing the effect of adjustments made to the probe/sample positioning by the operator, for example, gradually moving the probe in a particular direction.

Various presentations of the MQM on the display device 120 may be suitable to increase the effectiveness of conveying measurement quality. Such presentations may include visual (e.g., graphical or numerical), auditory (e.g., modulated tone pattern or frequency), or haptic (e.g., modulated vibrational pattern or frequency) in addition to graphical features described herein. Such presentations may aid operators with disabilities or those who are working in an environment that interferes with one or more alternative presentations (e.g., due to obstructed views or loud ambient noise).

At least one embodiment of the focusing method 200 may include a step 228 of displaying a spectrum 128 that illustrates the combined measurement, where the displayed spectrum 128 is updated at the end of each update interval. Displaying the spectrum 128 aids the operator in rejecting (i.e., not adjusting in response to) spurious, seemingly "good" MQM values arising from non-sample sources (e.g., sample containers or other noise sources), which exhibit aberrant spectral shape.

In the step 228, a moving average function may be applied to the displayed spectrum 128, such that the spectrum 128 represents a combination of a predetermined number of the recent measurements. Use of a moving average function preserves the regular update interval while permitting the display of spectral detail that may not be discernible in the space of a single update interval due to insufficient signal intensity. When applying the moving average function to spectral data, the displays of the MQM (including the MQM indicator 122 and/or MQM trendline indicator 126) may include, in addition to values for the current update interval, values corresponding to the combined spectrum generated by the moving average function.

In the step 228, when applying the moving average function to displayed measurement data, a perceptible indicator (e.g., visible, audible, or haptic) may be generated to convey to the operator the frequency with which there is a complete turnover in the measurements factored into the moving average. For example, with an update interval of one second, and a moving average function which combines the eight most recent measurements, the indicator could convey that the moving average "turns over" every eight seconds. In the step 228, the turnover indicator 132 may be the perceptible indicator. With respect to the MQM trendline indicator 126, the perceptible indicator may be a distinguished region (e.g., shaded) of the time axis corresponding to the interval currently included in the moving average function.

In displaying the information described herein, the y-axis (i.e., ordinate) of the measured spectrum 128 may be normalized. As nonlimiting examples, the spectrum 128 may be normalized by proportional scaling of the values relative to a maximum or minimum value in the current spectrum, to a target spectrum or to the spectrum corresponding to a desired MQM (i.e., desired measurement quality) previously observed. Normalizing the measured spectrum 128 provides a stable presentation of spectral shape in a scale-independent fashion that is not influenced by the length of the update interval, the number and length of individual measurements in an update interval, or the application of a moving average function. When a moving average function is applied, normalization facilitates assigning equal weight to measurements with low intensity and those with high intensity. Otherwise, the characteristics of a spectrum resulting from combining a high-intensity spectrum with a low-intensity spectrum may be substantially similar to the high-intensity spectrum alone and may result in under-appreciation of the information contributed by the low-intensity spectrum.

In at least one embodiment of the focusing method 200, in the step 218, calculating the MQM can be limited to information in a selected portion of the spectral range of the measurement data (i.e., the x-axis). Limiting the spectral range enables the operator to optimize the MQM for a spectral region of interest, even where a MQM for the spectrum as a whole is dominated by spectral features outside the region of interest. In a further embodiment, in the step 218, a ratio may be calculated of the MQMs corresponding to two separate, selected portions of the spectral range. In such an embodiment, the calculated ratio may be used in place of the individual MQMs in the focusing method 200 described herein. Use of a calculated ratio of MQMs simplifies optimizing a relatively weak signal on a dominant background or focusing on a spatially distinct region of a non-homogenous sample.

Measurement quality may be quantified in various ways. Accordingly, the MQM may be implemented in many ways and according to various metrics. Nonlimiting examples of quantifying measurement quality include intensity per second, detector saturation per second, signal-to-noise ratio at a fixed acquisition length, residual sum of squares of the measured spectrum relative to a known reference, and repeatability of a sample property of interest (e.g., melt index) as calculated by an analytical model. Depending on the specific measurement quality metric selected, the optimal MQM may be a minimum, maximum or desired value of the selected metric.

The techniques and methods disclosed herein for assisting an operator in optimizing an MQM can be applied to the optimization of various aspects of measurement quality besides probe/sample positioning. When the operator is provided with appropriate controls to modulate configurable parameters of the spectrometer, suitably implemented MQMs enable the techniques and methods disclosed herein to assist the operator in the optimization of such parameters as detector gain, detector temperature, spectrograph etendue, spectrograph dispersion, spectrograph slit width, numerical aperture of the sampling optic of the probe, laser wavelength, and band position relative to detector matrix.

Computerized automation may be used in conjunction with any steps of the focusing method 200 to enhance metrics including performance, throughput, and so forth. For example, automatic, physical positioning of the probe and/or sample may be implemented. In such an embodiment, the MQM is used to guide an automated algorithm for achieving optimal positioning without operator participation. Automation may further be applied to determining whether to apply the moving average function and/or to controlling the number of consecutive measurements to be combined in the function.

While various embodiments of a spectroscopic system and methods for using and constructing the same have been described in considerable detail herein, the embodiments are merely offered by way of non-limiting examples of the disclosure described herein. It will therefore be understood that various changes and modifications may be made, and equivalents may be substituted for elements thereof, without departing from the scope of the disclosure. Indeed, this disclosure is not intended to be exhaustive or to limit the scope of the disclosure.

Further, in describing representative embodiments, the disclosure may have presented a method and/or process as a particular sequence of steps. However, to the extent that the method or process does not rely on the particular order of steps set forth herein, the method or process should not be limited to the particular sequence of steps described. Other sequences of steps may be possible and still remain within the scope of the present disclosure.

The invention claimed is:
1. A method of assisting an operator of a spectrometer to enhance the quality of a spectral measurement of a sample, the method comprising:
   providing a spectrometer including a probe and a detector having a dynamic range, wherein the spectrometer is controlled by a processor in communication with a display device;
   defining a regular update interval;
   performing a series of automatic, individual spectral measurements of a sample during the update interval;
   at the end of the update interval, calculating and displaying via the display device a measurement quality metric (MQM) based upon a combined spectral measurement of the sample taken during update interval using the processor;
   providing information to the operator enabling the operator to optimize the MQM; and
   repeating the series of individual spectral measurements, calculating and displaying the MQM, and providing information to the operator until a desired quality of the combined spectral measurement of the sample is achieved.

2. The method of claim 1, wherein the information provided to the operator includes information advising the operator to position the probe and/or the sample to optimize the MQM.

3. The method of claim 1, wherein optimizing the MQM includes minimizing, maximizing or approaching a desired value.

4. The method of claim 1, the method further comprising dynamically adjusting the length and number of individual measurements in the update interval to stay within the dynamic range of the detector.

5. The method of claim 1, the method further comprising aggregating the individual measurements taken during an update interval into the combined spectral measurement for that update interval.

6. The method of claim 1, wherein the update interval is approximately one second.

7. The method of claim 1, wherein the MQM is a function of time.

8. The method of claim 1, wherein the MQM is a spectral intensity per unit time.

9. The method of claim 1, wherein the MQM is a detector saturation per unit time.

10. The method of claim 1, wherein the MQM is a signal-to-noise ratio at a fixed acquisition length.

11. The method of claim 1, wherein the MQM is a residual sum of squares of the measured spectrum versus a known reference.

12. The method of claim 1, wherein the MQM is a repeatability of a sample property of interest as calculated using an analytical model.

13. The method of claim 12, wherein the sample property of interest is melt index.

14. The method of claim 1, wherein the MQM and the information provided to the operator are used to optimize one or more of the following: detector gain, detector temperature, spectrograph etendue, spectrograph dispersion, spectrograph slit width, numerical aperture of the probe, laser wavelength, and band position relative to a detector matrix of the detector.

15. The method of claim 1, wherein the information provided to the operator is visual, auditory or haptic.

16. The method of claim 15, wherein the visual information provided to the operator is graphical or numerical.

17. The method of claim 15, wherein the auditory information provided to the operator is a modulated tone pattern or an audio frequency.

18. The method of claim 15, wherein the haptic information provided to the operator is a modulated vibrational pattern or a vibrational frequency.

19. A spectroscopic system for enhancing the quality of a spectral measurement of a sample, the spectroscopic system comprising:
  a spectrometer having a detector in optical communication with a probe having a sample optic, wherein the spectrometer is adapted to measure signals from a sample;
  a display device; and
  a processor configured to control the spectrometer and the display device and to calculate a measurement quality metric (MQM), the processor further configured to develop a spectrum from the measured signals, to display the spectrum on the display device, to provide information to an operator of the spectrometer, enabling the operator to optimize the MQM until a desired quality of the combined spectral measurement of the sample is achieved.

20. The spectroscopic system of claim 19, wherein the MQM is one of the following: a function of time; a spectral intensity per unit time; a detector saturation per unit time; a signal-to-noise ratio at a fixed acquisition length; a residual sum of squares of the measured spectrum versus a known reference; and a sample property of interest as calculated using an analytical model.

* * * * *